US009394836B2

(12) United States Patent
Saito et al.

(10) Patent No.: US 9,394,836 B2
(45) Date of Patent: Jul. 19, 2016

(54) INTERNAL COMBUSTION ENGINE CONTROL APPARATUS

(75) Inventors: Toshikatsu Saito, Chiyoda-ku (JP); Takahiko Ono, Kobe (JP); Keitaro Ezumi, Aki-gun (JP); Tomokuni Kusunoki, Aki-gun (JP); Atsushi Inoue, Aki-gun (JP); Hiroki Morimoto, Aki-gun (JP)

(73) Assignees: Mitsubishi Electric Corporation, Tokyo (JP); Mazda Motor Corporation, Hiroshima (JP)

( * ) Notice: Subject to any disclaimer, the term of this patent is extended or adjusted under 35 U.S.C. 154(b) by 467 days.

(21) Appl. No.: 13/611,219

(22) Filed: Sep. 12, 2012

(65) Prior Publication Data
US 2013/0151127 A1 Jun. 13, 2013

(30) Foreign Application Priority Data
Dec. 12, 2011 (JP) ................................. 2011-270891

(51) Int. Cl.
F02D 35/02 (2006.01)
F02D 41/22 (2006.01)
(Continued)

(52) U.S. Cl.
CPC ............ F02D 35/027 (2013.01); F02D 41/222 (2013.01); G01L 23/227 (2013.01); F02D 41/0002 (2013.01); F02D 2041/288 (2013.01); F02P 5/152 (2013.01); Y02T 10/40 (2013.01)

(58) Field of Classification Search
CPC .... G01L 23/225; G01M 15/11; F02D 35/027; F02D 2041/228; F02D 35/023; F02D 2041/286; F02P 5/152; F02P 5/1526; F02P 5/1521; F02P 5/1527; Y02T 10/46

USPC ................ 701/100–115; 123/406.16, 406.21, 123/406.29, 406.37, 406.38, 406.39; 73/35.01–35.13
See application file for complete search history.

(56) References Cited

U.S. PATENT DOCUMENTS 4,976,241 A * 12/1990 Ishida et al. ............. 123/406.37
5,230,316 A * 7/1993 Ichihara et al. .......... 123/406.38
(Continued)

FOREIGN PATENT DOCUMENTS

CN 1389714 A 1/2003
CN 101356356 A 1/2009
(Continued)

OTHER PUBLICATIONS

Communication dated Dec. 18, 2014, issued by the State Intellectual Property Office of the People's Republic of China in counterpart Application No. 201210491653.5.

*Primary Examiner* — Stephen K Cronin
*Assistant Examiner* — Susan E Scharpf
(74) *Attorney, Agent, or Firm* — Sughrue Mion, PLLC

(57) ABSTRACT

An internal combustion engine control apparatus includes a pseudo knock determination unit that determines whether or not a pseudo knock has been produced in a knock detection window, based on at least one of the frequency, a status amount indicating a rotation speed of the internal combustion engine, a status amount indicating a load of the internal combustion engine, and a status amount indicating an air-fuel ratio of the internal combustion engine; and a moving-average processing unit that sets a second period to a period that is approximately the same as a first period, in the case where it has been determined that the pseudo knock was not produced, and that does not implement moving-averaging or sets the second period to a period that is narrower than the first period, in the case where it has been determined that a pseudo knock was produced.

8 Claims, 11 Drawing Sheets

(51) Int. Cl.
*G01L 23/22* (2006.01)
*F02P 5/152* (2006.01)
*F02D 41/00* (2006.01)
*F02D 41/28* (2006.01)

(56) References Cited

U.S. PATENT DOCUMENTS

| | | | |
|---|---|---|---|
| 5,287,282 A * | 2/1994 | Imai | 701/111 |
| 5,544,058 A * | 8/1996 | Demizu et al. | 701/33.9 |
| 6,701,894 B2 * | 3/2004 | Katagami | 123/406.33 |
| 6,862,517 B2 * | 3/2005 | Galtier | 701/111 |
| 6,868,330 B2 * | 3/2005 | Saikkonen | 701/111 |
| 7,263,430 B2 * | 8/2007 | Kasashima et al. | 701/111 |
| 7,673,615 B2 * | 3/2010 | Oe et al. | 123/406.29 |
| 7,853,400 B2 * | 12/2010 | Matsushima et al. | 701/111 |
| 8,103,432 B2 * | 1/2012 | Saito | 701/111 |
| 2002/0195085 A1 | 12/2002 | Katagami | |
| 2007/0062488 A1 * | 3/2007 | Kobayashi et al. | 123/406.16 |
| 2007/0175444 A1 * | 8/2007 | Kaneko et al. | 123/406.16 |
| 2008/0120018 A1 * | 5/2008 | Wiles | 701/111 |
| 2008/0262705 A1 | 10/2008 | Oe et al. | |
| 2009/0287398 A1 * | 11/2009 | Saito | 701/111 |
| 2010/0174472 A1 * | 7/2010 | Matsushima et al. | 701/111 |

FOREIGN PATENT DOCUMENTS

| | | |
|---|---|---|
| JP | 3083546 B2 | 6/2000 |
| JP | 2006-348764 A | 12/2006 |

* cited by examiner

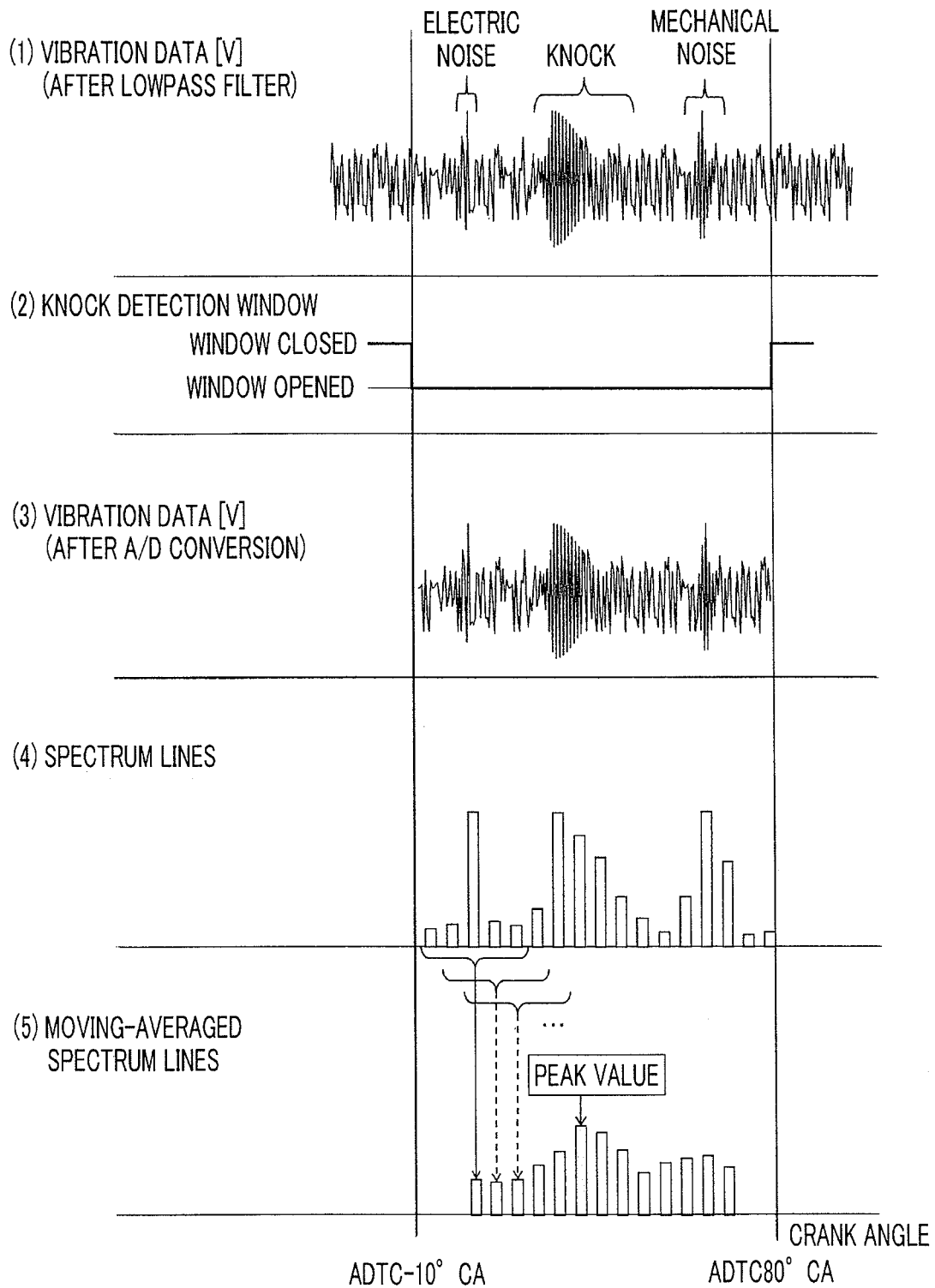

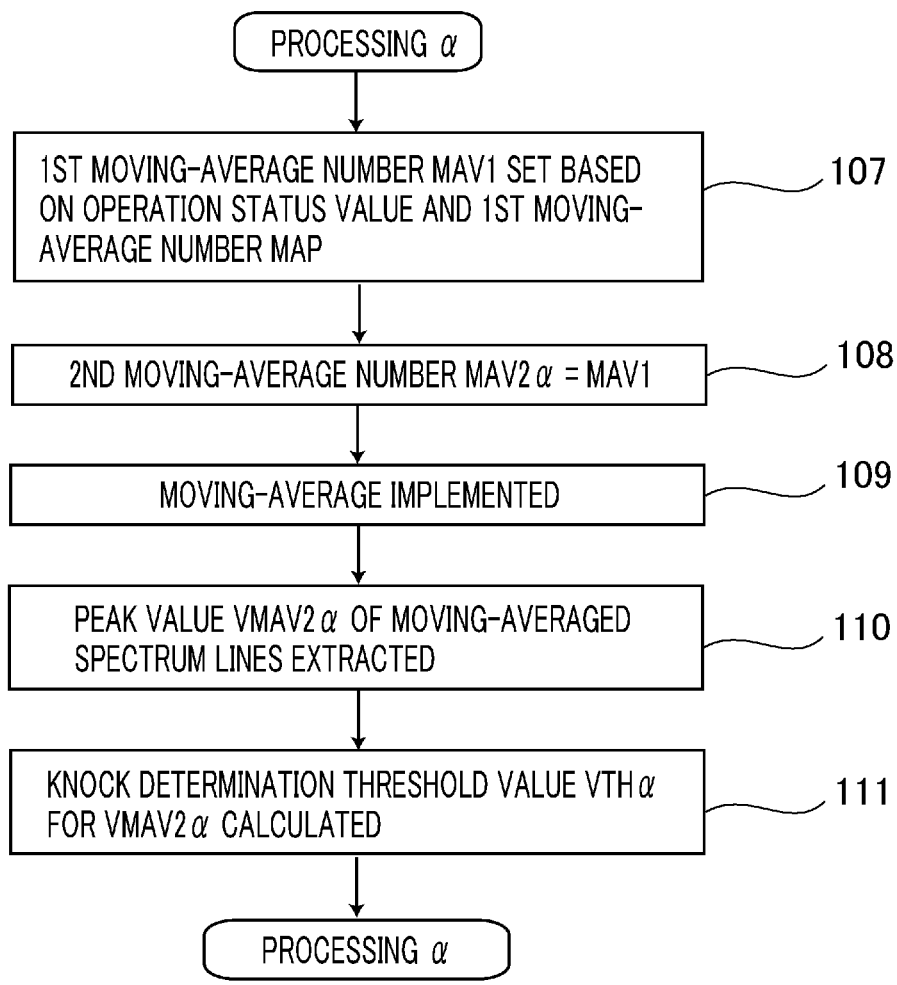

FIG. 6

⟨PSEUDO KNOCK DETERMINATION MAP⟩

| | | | LOW FREQUENCY : F1 | HIGH FREQUENCY : F2 |
|---|---|---|---|---|
| Ne < Ne(1) | Ce < Ce(1) | | PSEUDO KNOCK NOT PRODUCED | PSEUDO KNOCK NOT PRODUCED |
| | Ce ≧ Ce(1) | A/F ≦ A/F(1) | PSEUDO KNOCK PRODUCED | PSEUDO KNOCK NOT PRODUCED |
| | | A/F > A/F(1) | PSEUDO KNOCK NOT PRODUCED | PSEUDO KNOCK NOT PRODUCED |
| Ne(1) ≦ Ne < Ne(2) | Ce < Ce(2) | | PSEUDO KNOCK NOT PRODUCED | PSEUDO KNOCK NOT PRODUCED |
| | Ce ≧ Ce(2) | A/F ≦ A/F(2) | PSEUDO KNOCK NOT PRODUCED | PSEUDO KNOCK PRODUCED |
| | | A/F > A/F(2) | PSEUDO KNOCK NOT PRODUCED | PSEUDO KNOCK NOT PRODUCED |
| Ne ≧ Ne(2) | | | PSEUDO KNOCK NOT PRODUCED | PSEUDO KNOCK NOT PRODUCED |

⟨1ST MOVING-AVERAGE NUMBER MAP⟩

| | | LOW FREQUENCY : F1 | HIGH FREQUENCY : F2 |
|---|---|---|---|
| $Ne < Ne1\,(1)$ [LOW ROTATION SPEED REGION (A1)] | $Ce < Ce1\,(1)$ [LOW LOAD REGION (B1)] | MAV1 (A1, B1, F1) | MAV1 (A1, B1, F2) |
| | $Ce1\,(1) \leqq Ce < Ce1\,(2)$ [MIDDLE LOAD REGION (B2)] | MAV1 (A1, B2, F1) | MAV1 (A1, B2, F2) |
| | $Ce \geqq Ce1\,(2)$ [HIGH LOAD REGION (B3)] | MAV1 (A1, B3, F1) | MAV1 (A1, B3, F2) |
| $Ne\,(1) \leqq Ne < Ne1\,(2)$ [MIDDLE ROTATION SPEED REGION (A2)] | $Ce < Ce1\,(3)$ [LOW LOAD REGION (B4)] | MAV1 (A2, B4, F1) | MAV1 (A2, B4, F2) |
| | $Ce1\,(3) \leqq Ce < Ce1\,(4)$ [MIDDLE LOAD REGION (B5)] | MAV1 (A2, B5, F1) | MAV1 (A2, B5, F2) |
| | $Ce \geqq Ce1\,(4)$ [HIGH LOAD REGION (B6)] | MAV1 (A2, B6, F1) | MAV1 (A2, B6, F2) |
| $Ne \geqq Ne1\,(2)$ [HIGH ROTATION SPEED REGION (A3)] | $Ce < Ce1\,(5)$ [LOW LOAD REGION (B7)] | MAV1 (A3, B7, F1) | MAV1 (A3, B7, F2) |
| | $Ce1\,(5) \leqq Ce < Ce1\,(6)$ [MIDDLE LOAD REGION (B8)] | MAV1 (A3, B8, F1) | MAV1 (A3, B8, F2) |
| | $Ce \geqq Ce1\,(6)$ [HIGH LOAD REGION (B9)] | MAV1 (A3, B9, F1) | MAV1 (A3, B9, F2) |

Y

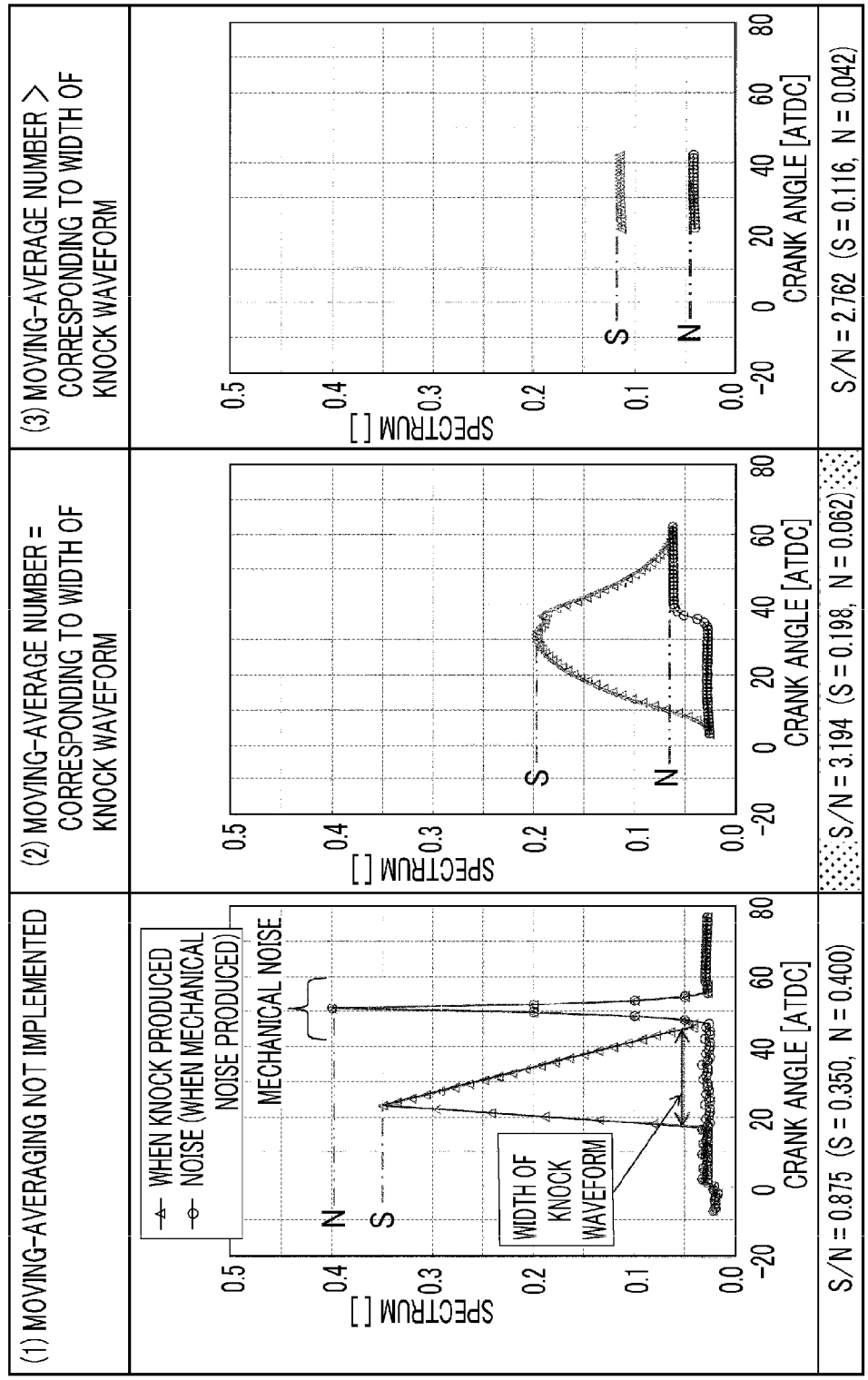

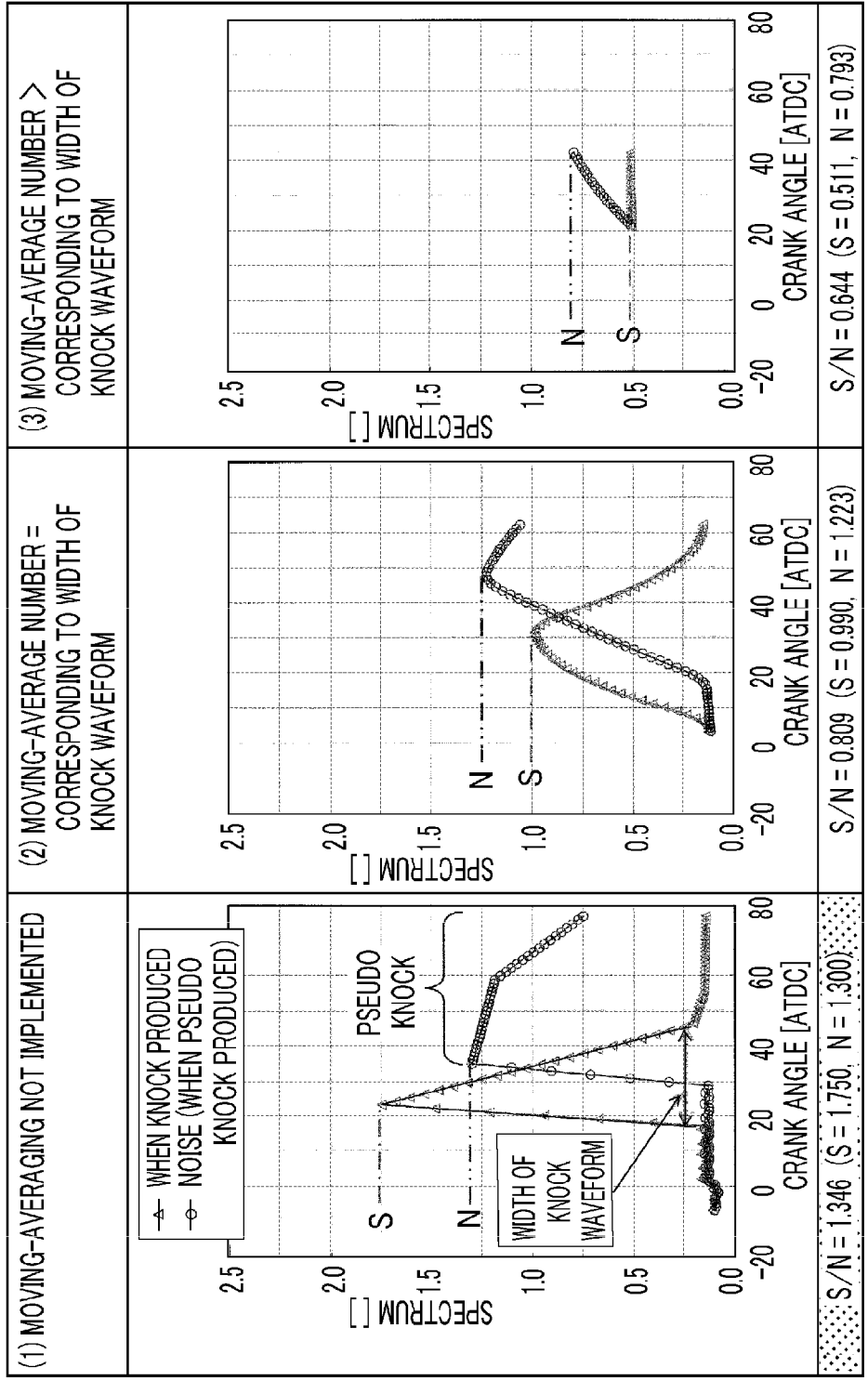

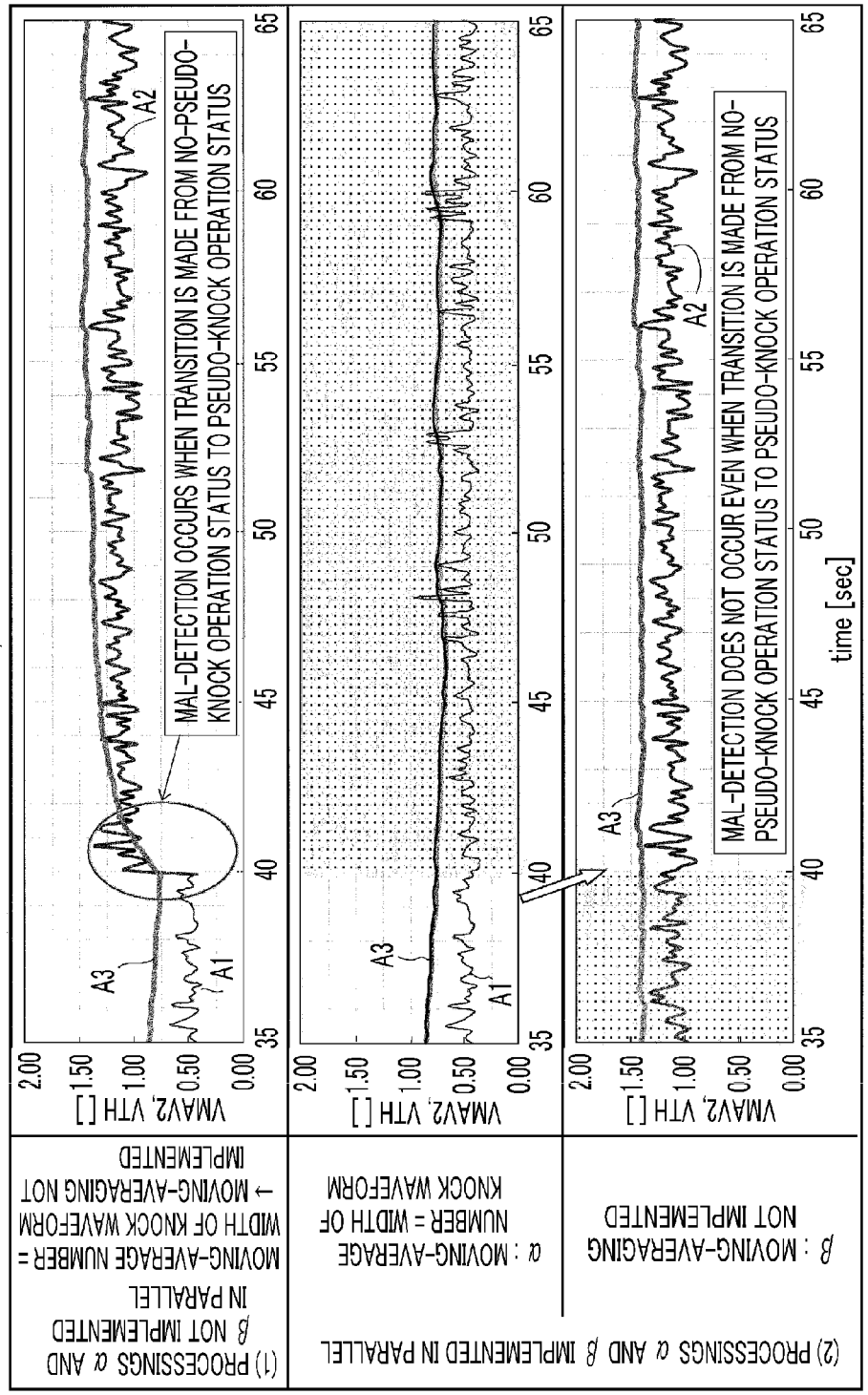

INTERNAL COMBUSTION ENGINE CONTROL APPARATUS

BACKGROUND OF THE INVENTION

1. Field of the Invention

The present invention relates to an internal combustion engine control apparatus and more particularly to an internal combustion engine control apparatus provided with a knock detection function for detecting a knock caused in an internal combustion engine.

2. Description of the Related Art

To date, a method has been known in which a knock phenomenon caused in an internal combustion engine is detected by use of a vibration sensor. In this method, a knock is detected in such a way that the level of an inherent-frequency vibration in a predetermined knock detection window is extracted based on a fact that when the knock is caused during operation of an internal combustion engine, there is caused a vibration having an inherent frequency corresponding to the internal combustion engine or the vibration mode of the knock. It is commonly known that an inherent-frequency vibration level is extracted through a method utilizing an analogue band-pass filter circuit, or by performing digital-signal processing such as a short-time Fourier transformation (referred to as "SlFT", hereinafter) or a discrete Fourier transformation (referred to as "DFT", hereinafter).

Meanwhile, in the extracted inherent-frequency vibration level, there may be superimposed electric noise or mechanical noise, caused by seating of an intake valve or an exhaust valve or caused due to starting or ending of fuel injection by an injector. Accordingly, in the technology disclosed in Patent Document 1 (Japanese Patent Application Laid-Open No. 2006-348764), attention is focused on the fact that while a knock waveform formed of the level of a vibration caused by a knock gradually attenuates after reaching its peak, an electric-noise waveform and a mechanical-noise waveform formed of the vibration level of mechanical noise rapidly attenuate after reaching their peaks, and switching is performed between a first frequency and a second frequency, which are preliminarily set, in accordance with the operation status of an internal combustion engine, so that an inherent frequency, at which the knock waveform conspicuously appears, is obtained.

More specifically, in the technology disclosed in Patent document 1, the frequency is switched to the first frequency in a first operation status and is switched to the second frequency in a second operation status. Then, in the first frequency, determination on the occurrence of a knock is performed based on the peak value of a vibration level; in the second frequency, determination on the occurrence of a knock is performed based on the integration value of a vibration level.

In the conventional technology disclosed in Patent Document 1, the integration value of the level of a second-frequency vibration is utilized for the second frequency on which mechanical noise and electric noise are superimposed, and the area of a vibration level, in a knock detection window, that includes a knock waveform and the area of a vibration level, in the knock detection window, that includes a mechanical noise waveform are compared with each other; therefore, the S/N ratio can be raised in comparison with a case where the peak value of a vibration level, in a knock detection window, that includes a knock waveform and the peak value of a vibration level that includes a mechanical noise waveform are compared with each other.

Due to various factors such as environmental conditions (e.g., the temperature of oil in the internal combustion engine and the temperature of coolant water) in the combustion chamber of an internal combustion engine and variations in internal combustion engines (e.g., variations in the compression ratios in combustion chambers), the starting position of a knock waveform for a crank angle from the compression top dead center varies. Therefore, it is difficult to appropriately set a knock detection window in such a way that the respective edges thereof are aligned to the starting position and the end position of the knock waveform; thus, the area of the knock detection window needs to be set wider to some extent. In contrast to the conventional technology disclosed in Patent Document 1, in the technology disclosed in Patent Document 2 (Japanese Patent No. 3083546), vibration levels (that denote, in Patent Document 2, spectrum lines calculated through implementation of STFT) in a knock detection window are moving-averaged every predetermined spectra, and based on the moving-averaged spectrum lines, determination on the occurrence of a knock is performed.

In the conventional technology disclosed in Patent Document 2, even though the area of a knock detection window is set wider to some extent, moving-average processing is performed in a period (predetermined spectrum lines) corresponding to the width between the starting position and the end position of a knock waveform, so that a period is grasped in which the level of a vibration caused by a knock conspicuously appears; therefore, as is the case where the integration value of a vibration level, in the technology disclosed in Patent Document 1, is utilized, the vibration levels of mechanical noise and electric noise can be reduced.

PRIOR ART REFERENCE

Patent Document

[Patent Document 1] Japanese Patent Application Laid-Open No. 2006-348764
[Patent Document 2] Japanese Patent No. 3083546

In the conventional technology disclosed in Patent Document 1, determination on the occurrence of a knock is performed based on the peak value of a first-frequency vibration level in the knock detection window; however, it should be understood that in some internal combustion engines, mechanical noise and electric noise are superimposed on both the first frequency and the second frequency. With regard to this, it is conceivable that even in the case of the first frequency, determination on the occurrence of a knock is performed based on the integration value of a vibration level in the knock detection window. This method is equivalent to the method in which in the conventional technology disclosed in Patent Document 2, for each of a plurality of inherent frequencies, spectrum lines in the knock detection window are moving-averaged every predetermined spectra.

However, for example, in such a specific operation status as that "the rotation speed of the internal combustion engine is approximately 2000 [r/min], the load is high, and the air-fuel ratio (referred to as "A/F", hereinafter) is enriched", unique combustion noise may occur in an inherent frequency; in that case, when as in the technology disclosed in Patent Document 1, the integration value of a vibration level in the knock detection window is utilized, the S/N ratio is deteriorated when a pseudo nock occurs.

FIG. 9 is a set of explanatory graphs for comparing the characteristics of the relationship between the crank angle and the spectrum at a time when a knock occurs with the characteristics of the relationship between the crank angle and the spectrum at a time when no knock occurs but a pseudo knock occurs; the abscissa denotes the crank angle, and the ordinate denotes the spectrum. FIG. 9(1) represents the characteristics of the relationship between the crank angle and the spectrum at a time when a DFT is implemented by utilizing vibration data in the crank-angle range from [−10°] CA after Top Dead Center (referred to as "ATDC", hereinafter) to ATDC[80°] CA.

FIG. 9(2) represents the characteristics of the relationship between the crank angle and the spectrum at a time when the characteristics of the relationship between the crank angle and the spectrum represented in FIG. 9(1) are moving-averaged by utilizing spectra, the number of which corresponds to a period the same as the width of the knock waveform. FIG. 9(3) represents the characteristics of the relationship between the crank angle and the spectrum at a time when the characteristics of the relationship between the crank angle and the spectrum represented in FIG. 9(1) are moving-averaged by utilizing spectra, the number of which is larger than that of the spectra with which FIG. 9(2) is obtained. In addition, in the following explanation, the number of spectra utilized for moving-average processing will be referred to as a moving-average number.

In FIGS. 9(1), 9(2), and 9(3), "S" is the peak value of the characteristics of the relationship between the crank angle and the spectrum at a time when a knock occurs, and "N" is the peak value of the characteristics of the relationship between the crank angle and the spectrum at a time when a pseudo knock occurs; "S/N" is the ratio of the peak value S to the peak value N.

As illustrated in FIG. 9(1), the spectrum level of the pseudo knock waveform is characterized by attenuating further more slowly after reaching the peak value N than the spectrum level of the knock waveform attenuates after reaching the peak value S. When, in the case where a pseudo knock occurs, moving-average processing is performed, the S/N ratios become 1.346, 0.809, and 0.664 in FIGS. 9(1), 9(2), and 9(3), respectively. As described above, the S/N ratio becomes smaller as the moving-average number (corresponding to the period of a knock detection window in Patent Document 1) is larger; thus, there is posed a problem that in the case where the frequency on which a pseudo knock is superimposed is approximately the same as the inherent frequency, the knock detectability and the mal-detection tolerance are deteriorated.

However, in the conventional technology disclosed in patent Document 1, determination on the occurrence of a knock is performed, in the second frequency on which mechanical noise and electric noise are superimposed, based on the integration value of a vibration level in the knock detection window, regardless of the occurrence of a pseudo knock; in addition, also in the conventional technology disclosed in Patent Document 2, regardless of the occurrence of a pseudo knock, Determination on the occurrence of a knock is performed based on the method in which spectrum lines are sequentially moving-averaged every predetermined moving-average number; therefore, there is posed a problem that in the case where a pseudo knock is superimposed, the knock detectability and the mal-detection tolerance are deteriorated.

SUMMARY OF THE INVENTION

The present invention has been implemented in order to solve the foregoing problems in conventional technologies; the objective thereof is to provide an internal combustion engine control apparatus that can suppress the knock detectability and the mal-detection tolerance from being deteriorated, even when a pseudo knock occurs.

An internal combustion engine control apparatus according to the first invention of the present application includes a vibration detection unit that detects, as vibration data, a vibration or a pressure wave produced inside a cylinder of an internal combustion engine; a knock detection window setting unit that preliminarily sets a knock detection window, in accordance with an operation status of the internal combustion engine, in such a way that the knock detection window includes a first period in which the level of a vibration produced by a knock of the internal combustion engine conspicuously appears; a digital-signal processing unit that concurrently calculates, with regard to a plurality of frequencies, vibration levels, in steps of a predetermined time, that are obtained by applying a time-frequency analysis to the vibration data detected in the knock detection window; a moving-average processing unit that concurrently implements, with regard to the plurality of frequencies, processing in which the vibration levels in steps of the predetermined time are sequentially moving-averaged by use of a second period set based on the first period and then the peak value of the moving-averaged vibration levels is extracted; a knock determination unit that concurrently implements, with regard to the plurality of frequencies, processing in which a knock determination threshold value is calculated based on the extracted peak value and then the peak value and the knock determination threshold value are compared with each other so that it is determined whether or not the knock has been produced; a knock prevention unit that takes action for preventing the knock when determining that the knock has been produced, with regard to at least one of the plurality of frequencies; and a pseudo knock determination unit that determines whether or not a pseudo knock has been produced in the knock detection window, based on at least one of the frequency, a status amount indicating a rotation speed of the internal combustion engine, a status amount indicating a load of the internal combustion engine, and a status amount indicating an air-fuel ratio of the internal combustion engine. The first invention is characterized in that in the case where it has been determined that the pseudo knock was not produced, the moving-average processing unit sets the second period to a period that is approximately the same as the first period, and in the case where it has been determined that the pseudo knock was produced, the moving-average processing unit does not implement the moving-averaging or sets the second period to a period that is narrower than the first period.

An internal combustion engine control apparatus according to the second invention of the present application includes a vibration detection unit that detects, as vibration data, a vibration or a pressure wave produced inside a cylinder of an internal combustion engine; a knock detection window setting unit that preliminarily sets a knock detection window, in accordance with an operation status of the internal combustion engine, in such a way that the knock detection window includes a first period in which the level of a vibration produced by a knock of the internal combustion engine conspicuously appears; a digital-signal processing unit that concurrently calculates, with regard to a plurality of frequencies, vibration levels, in steps of a predetermined time, that are obtained by applying a time-frequency analysis to the vibration data detected in the knock detection window; a moving-average processing unit that concurrently implements, with regard to the plurality of frequencies, processing in which the vibration levels in steps of the predetermined time are sequentially moving-averaged by use of a second period set based on the first period and then the peak value of the moving-averaged vibration levels is extracted; a knock determination unit that concurrently implements, with regard to the plurality of frequencies, processing in which a knock determination threshold value is calculated based on the extracted peak value and then the peak value and the knock determination threshold value are compared with each other so that it is determined whether or not the knock has been produced; a knock prevention unit that takes action for preventing the knock when determining that the knock has been produced, with regard to at least one of the plurality of frequencies; and a pseudo knock determination unit that determines whether or not a pseudo knock has been produced in the knock detection window, based on at least one of the frequency, a status amount indicating a rotation speed of the internal combustion engine, a status amount indicating a load of the internal combustion engine, and a status amount indicating an air-fuel ratio of the internal combustion engine. The second invention is characterized in that the moving-average processing unit concurrently implements, with regard to the plurality of frequencies, processing in which regardless of the result of determination by the pseudo knock determination unit on whether or not the pseudo knock has been produced, the vibration levels in steps of the predetermined time are sequentially moving-averaged by use of the second period at a time when it has been determined that no pseudo knock was produced and the second period at a time when it has been determined that the pseudo knock was produced and then the peak value of the moving-averaged vibration levels is extracted; and the knock determination unit concurrently performs, with regard to the plurality of frequencies, processing in which the knock determination threshold value is calculated based on the extracted peak value.

In each of the foregoing inventions, the pseudo knock denotes a vibration-level status in which in the case where the moving-averaging is implemented by use of the second period set to be approximately equal to the first period, the ratio of the peak value at a time when a knock is produced to the peak value at a time when no knock is produced becomes the same as or smaller than a predetermined value.

In an internal combustion engine control apparatus according to the first invention of the present application, when a pseudo knock is produced, the moving-averaging is not implemented or implemented in a period that is narrower than the first period; therefore, there can be obtained an effect that even in the case where a pseudo knock is produced, the knock detectability and the mal-detection tolerance are suppressed from being deteriorated.

In an internal combustion engine control apparatus according to the second invention of the present application, a knock can rapidly be determined immediately after transition is made between an operation status where no pseudo knock is produced and an operation status where a pseudo knock is produced; therefore, there can be obtained an effect that a mal-detection is suppressed from occurring in a period from a time point immediately after transition is made between an operation status where no pseudo knock is produced and an operation status where a pseudo knock is produced to a time point when the knock determination threshold value stabilizes.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 4 is a set of imaginary charts representing signal processing that is performed by an internal combustion engine control apparatus according to Embodiment 1 of the present invention and in which vibration data is moving-averaged;

FIG. 5B is a flowchart for explaining the operation of an internal combustion engine control apparatus according to Embodiment 1 of the present invention;

FIG. 6 is a pseudo knock determination map in an internal combustion engine control apparatus according to Embodiment 1 of the present invention;

FIG. 7 is a first moving-average number map in an internal combustion engine control apparatus according to Embodiment 1 of the present invention;

FIG. 8 is a set of charts for comparing the characteristics of the relationship between the crank angle and the spectrum at a time when a knock occurs with the characteristics of the relationship between the crank angle and the spectrum at a time when mechanical noise occurs (but no knock occurs);

FIG. 9 is a set of explanatory graphs for comparing the characteristics of the relationship between the crank angle and the spectrum at a time when a knock occurs with the characteristics of the relationship between the crank angle and the spectrum at a time when no knock occurs but a pseudo knock occurs; and FIG. 10 is a set of charts representing the behaviors of the peak value and the knock determination threshold value at a time when no knock occurs, in an internal combustion engine control apparatus according to Embodiment 1 of the present invention.

DETAILED DESCRIPTION OF THE PREFERRRED EMBODIMENTS

Embodiment 1

Figure 1:
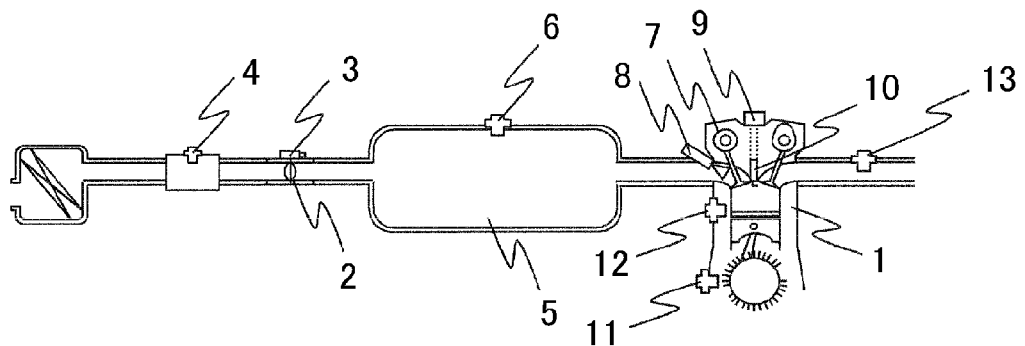
FIG. 1 is a configuration diagram schematically illustrating an internal combustion engine to which an internal combustion engine control apparatus according to Embodiment 1 of the present invention is applied.
Figure 2:
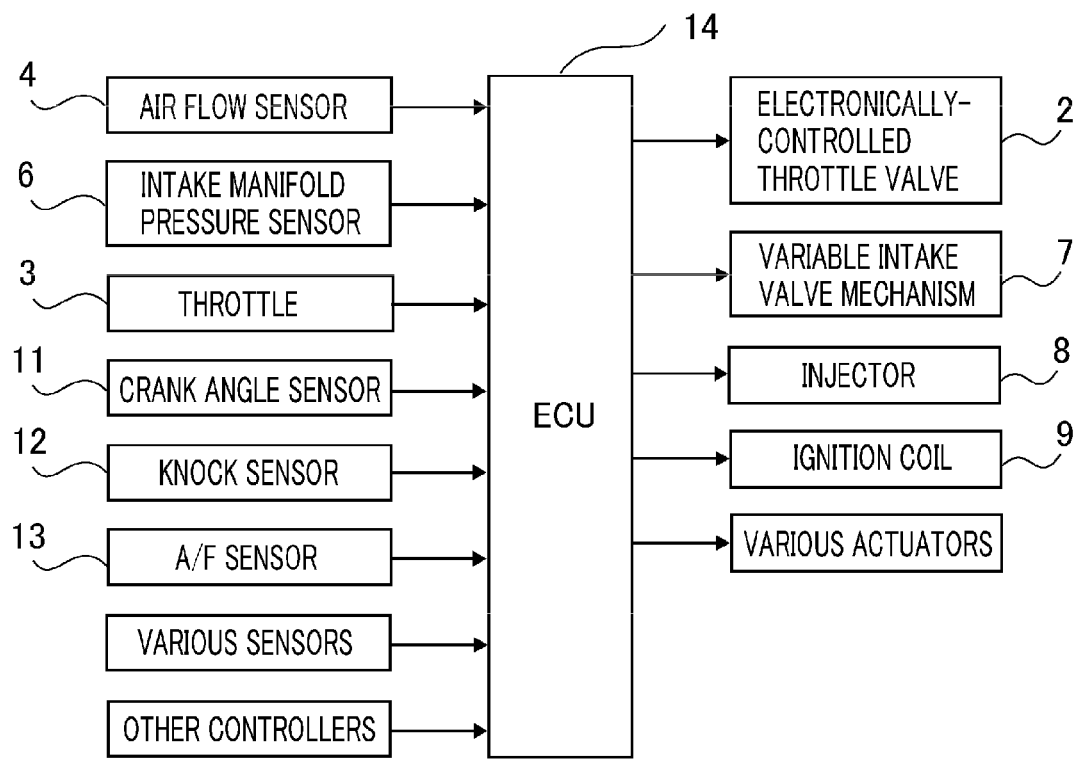
FIG. 2 is a configuration diagram schematically illustrating the control unit of an internal combustion engine control apparatus according to Embodiment 1 of the present invention.

Hereinafter, an internal combustion engine control apparatus according to Embodiment 1 of the present invention will be explained in detail with reference to the drawings. FIG. 1 is a configuration diagram schematically illustrating an internal combustion engine to which an internal combustion engine control apparatus according to Embodiment 1 of the present invention is applied. In general, an internal combustion engine for a vehicle such as an automobile is provided with a plurality of cylinders and a plurality of pistons; however, in FIG. 1, for the convenience of explanation, only a single cylinder and only a single piston are illustrated. FIG. 2 is a configuration diagram schematically illustrating the control unit of an internal combustion engine control apparatus according to Embodiment 1 of the present invention.

In FIG. 1, at the upstream side of the intake system of an internal combustion engine 1, there is provided an electronically-controlled throttle valve 2 that is electrically controlled to adjust the intake air flow rate. In order to measure the opening degree of the electronically-controlled throttle valve 2, a throttle opening degree sensor 3 is provided. Instead of the electronically-controlled throttle valve 2, there may be utilized a mechanical throttle valve directly coupled with an unillustrated accelerator pedal through a wire.

At the upstream side of the electronically-controlled throttle valve 2, there is provided an air flow sensor 4 that measures the intake air flow rate; in the vicinity of the internal combustion engine 1, which is situated at the downstream side of the electronically-controlled throttle valve 2, there is provided an intake manifold pressure sensor 6 that measures the inside pressure of a surge tank 5. Both the air flow sensor 4 and the intake manifold pressure sensor 6 may be provided, or either one of those may be provided.

At an intake valve provided in the intake port at the downstream side of the surge tank 5, there is provided a variable intake valve mechanism 7 that can variably control the opening/closing timing and the lift amount of the intake valve; an injector 8 that injects fuel is provided at the intake port. It may be allowed that the injector 8 is provided inside the cylinder of the internal combustion engine 1 in such a way that the injector 8 can inject fuel directly into the cylinder.

In the internal combustion engine 1, there are provided an ignition coil 9 and an ignition plug 10 for igniting a fuel-air mixture inside the cylinder of the internal combustion engine 1; a crank angle sensor 11 for detecting the edge of a plate provided on the crankshaft in order to detect the rotation speed and the crank angle of the internal combustion engine 1; a knock sensor 12, which serves as a vibration detection unit, for detecting, as vibration data, a vibration or a pressure wave produced inside the cylinder of the internal combustion engine 1; and an A/F sensor 13 for detecting the A/F, as the amount of the operation status of the internal combustion engine 1. In addition, instead of the knock sensor 12, there may be provided, for example, an inner-cylinder pressure sensor that measures, as vibration data, a pressure wave inside the cylinder of the internal combustion engine 1.

In FIG. 2, an intake air flow rate measured by the air flow sensor 4, an intake manifold pressure measured by the intake manifold pressure sensor 6, an opening degree of the electronically-controlled throttle valve 2 measured by the throttle opening degree sensor 3, a pulse that is outputted from the crank angle sensor 11 and is synchronized with the edges of the plates provided on the crankshaft, vibration data measured by the knock sensor 12, and an A/F, as the amount of the operation status of the internal combustion engine, measured by the A/F sensor 13 are inputted to an electronic control unit (referred to as an "ECU", hereinafter) 14. From various kinds of sensors other than the foregoing sensors, measurement values are inputted to the ECU 14; furthermore, signals from other controllers (such as an automatic transmission control system, a brake control system, and a traction control system) are also inputted to the ECU 14.

The ECU 14 calculates a target throttle opening degree, based on the accelerator opening degree and the operation status of the internal combustion engine, and controls the electronically-controlled throttle valve 2. In accordance with the operation status of the internal combustion engine 1, the ECU 14 controls the variable intake valve mechanism 7 for variably controlling the opening/closing timing of the intake valve, drives the injector 8 in such a way as to achieve a target A/F, and energizes the ignition coil 9 in such a way as to achieve a target ignition timing. When detecting a knock in such a manner as described later, the ECU 14 performs control in which by setting the target ignition timing to the angle delay side (retarding side), the knock is suppressed from occurring. Moreover, the ECU 14 calculates instruction values for various kinds of actuators other than those describes above.

Figure 3:
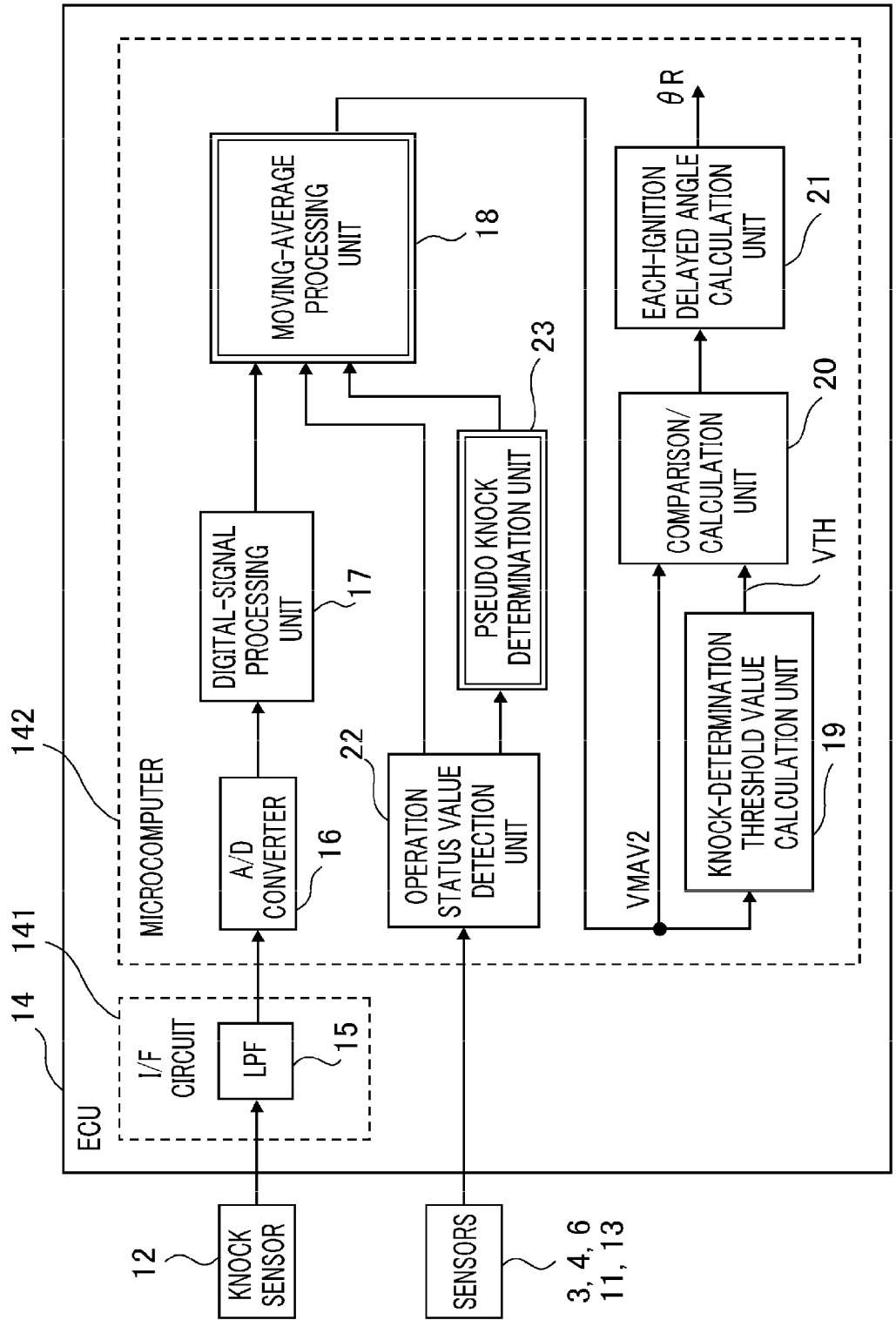
FIG. 3 is a configuration diagram schematically illustrating the knock control unit of an internal combustion engine control apparatus according to Embodiment 1 of the present invention.

Next, knock control, which is performed in the ECU 14, will be explained with reference to the drawings. FIG. 3 is a configuration diagram schematically illustrating the knock control unit of an internal combustion engine control apparatus according to Embodiment 1 of the present invention. FIG. 4 is a set of imaginary charts representing signal processing that is performed by an internal combustion engine control apparatus according to Embodiment 1 of the present invention and in which vibration data is moving-averaged; the ordinates in FIGS. 4(1), 4(2), 4(3), 4(4), and 4(5) denote vibration data that has passed through a lowpass filter, a knock detection window, A/D-converted vibration data, the spectrum lines calculated through DFT, and moving-averaged spectrum lines, respectively; the abscissa in each of FIGS. 4(1), 4(2), 4(3), 4(4), and 4(5) denotes the crank angle.

In FIG. 3, the knock sensor 12 and the ECU 14 correspond to those illustrated in FIGS. 1 and 2. Next, the configuration of the knock control unit of the ECU 14 will be explained. The ECU is configured with various kinds of I/F circuits 141 and a microcomputer 142. The microcomputer 142 is configured with an A/D converter for converting an analogue signal into a digital signal, a ROM region in which control programs and control constants are stored, a RAM region in which variables at a time when the programs are implemented are stored, and the like.

A lowpass filter (referred to as an "LPF", hereinafter) 15 in the I/F circuit 141 eliminates high-frequency components from variation data from the knock sensor 12, so that vibration data on which a knock, mechanical noise, and electric noise are superimposed is obtained.

The microcomputer 142 includes an A/D converter 16, a digital-signal processing unit 17, a moving-average processing unit 18, a knock-determination threshold value calculation unit 19, a comparison/calculation unit 20, an each-ignition delayed angle amount calculation unit 21, an operation status value detection unit 22, and a pseudo knock determination unit 23.

The A/D converter 16 performs an A/D conversion every predetermined time, for example, 10 [µs] or 20 [µs] so as to convert analogue vibration data from the LPF 15 into digital vibration data. The LPF 15 also includes a function of performing biasing, for example, at 2.5 [V] (keeping the center of vibration data at 2.5 [V]) for the purpose of making the A/D converter 16 take in all vibration data and a gain conversion function in which when being small, the vibration data is amplified with respect to 2.5 [V], and when being large, the vibration data is attenuated with respect to 2.5 [V] so that the vibration data falls into the range from 0 [V] to 5 [V].

It may be allowed that while the A/D converter 16 always performs an A/D conversion, only vibration data in a knock detection window is transmitted to the stages including and after the digital-signal processing unit 17; alternatively, it may be allowed that the A/D conversion is performed only in the knock detection window and then the A/D converted vibration data is transmitted to the stages including and after the digital-signal processing unit 17. FIG. 4(2) represents an image of the knock detection window; in Embodiment 1, the range from ATDC −10° to ATDC 80° is the knock detection window. FIG. 4(3) represents the A/D-converted vibration data in the knock detection window. In accordance with the operation status of the internal combustion engine 1, a knock detection window setting unit (unillustrated), which preliminarily sets a knock detection window, sets the knock detection window in such a way that the knock detection window includes a first period in which the level of a vibration produced by a knock of the internal combustion engine 1 conspicuously appears. The knock detection window setting unit is formed of the microcomputer 142.

The digital-signal processing unit 17 applies a time-frequency analysis through digital-signal processing to a digital signal from the A/D converter 16. Through the digital-signal processing such as STFT or DFT, spectrum lines, which are vibration levels in steps of a predetermined time at a plurality of inherent frequencies, are calculated. With regard to a plurality of frequencies, described later, the digital-signal processing unit 17 concurrently calculates vibration levels, in steps of a predetermined time, that are obtained by applying a time-frequency analysis to the vibration data detected in the knock detection window.

In the digital-signal processing by the digital-signal processing unit 17, inherent-frequency vibration levels may be extracted by use of an infinite impulse response (IIR) filter or a finite impulse response (FIR) filter. The calculation in the digital-signal processing unit 17 may be performed while A/D conversion is implemented or may collectively be implemented through interruption processing synchronized with the rotation of the internal combustion engine 1. FIG. 4(4) represents an image of spectrum lines calculated through DFT.

By use of a plurality of operation status values detected by the operation status value detection unit 22 based on the signals from a plurality of sensors such as the throttle opening degree sensor 3, the air flow sensor 4, the intake manifold pressure sensor 6, the crank angle sensor 11, and the A/F sensor 13, the pseudo knock determination unit 23 determines whether or not a pseudo knock has been produced; then, the result of the determination is transmitted to the moving-average processing unit 18. In order to set a first moving-average number corresponding to the first period, described later, the plurality of operation status values detected by the operation status value detection unit 22 are also inputted to the moving-average processing unit 18.

From the first moving-average number based on the plurality of operation status detection values detected by the operation status value detection unit 22 and based on the determination result, from the pseudo knock determination unit 23, indicating that a pseudo knock has been produced, the moving-average processing unit 18 sets a second moving-average number corresponding to a second period that is set based on the first period; after that, by use of the second moving-average number, the moving-average processing unit 18 sequentially moving-averages the spectrum lines calculated by the digital-signal processing unit 17 and then extracts the peak value VMAV2 of the moving-averaged spectrum lines. The moving-average processing unit 18 concurrently performs the processing items of extracting the peak value of the moving-averaged vibration levels, with regard to the plurality of frequencies.

FIG. 4(5) represents an image of the moving-averaged spectrum lines when moving-average processing is applied, with the moving-average number of 5, to the spectrum lines represented in FIG. 4(4). As represented in FIG. 4(5), the moving-averaged spectrum lines are calculated in such a way that as represented in FIGS. 4(4) and 4(5), the average value of the spectrum lines from the first spectrum to the fifth spectrum in FIG. 4(4) becomes the first spectrum in FIG. 4(5), the average value of the spectrum lines from the second spectrum to the sixth spectrum in FIG. 4(4) becomes the second spectrum in FIG. 4(5), and so on. Then, the peak value VMAV2 is extracted from the moving-averaged spectrum lines represented in FIG. 4(5).

In FIG. 3, the knock-determination threshold value calculation unit 19 calculates a knock determination threshold value VTH. The knock determination threshold value VTH is calculated at each of a plurality of inherent frequencies, by use of the equations (1) through (3) below. At first, by use of the equation (1) below, the peak value VMAV2 calculated every cycle (every stroke of an internal combustion engine, in the case of an internal combustion engine control apparatus in which calculation of a knock determination threshold value is not performed for each cylinder) is filter-processed so as to be averaged.

$$VBGL(n)=K1(n) \times VBGL(n-1)+(1-K1(n)) \times VMAV2(n) \quad (1)$$

where VBGL(n) is a filtered value, VMAV2(n) is the peak value of spectrum lines moving-averaged by use of the second moving-average number, K1(n) is a first filter coefficient, and n is the number of cycles.

Next, by use of the equations (2) and (3) below, the variance and the standard deviation are calculated.

$$VV(n)=K2(n) \times VV(n-1)+(1-K2(n)) \times (VBGL(n)-VMAV2(n))^2 \quad (2)$$

where VSGM(n) is a standard deviation, VV(n) is a variance, K2(n) is a second filter coefficient, sqrt is the square root calculation function.

Next, by use of the equation (4) below, the knock determination threshold value will be calculated.

$$VTH(n)=VBGL(n)+Kth \times VSGM(n) \quad (4)$$

where VTH(n) is a knock determination threshold value, and Kth is a threshold value calculation coefficient.

The knock determination threshold value VTH may be calculated by use of another method than the foregoing method according to the equations (1) through (4).

Next, the comparison/calculation unit 20, which serves as a knock determination unit, compares the peak value VMAV2 with the knock determination threshold value VTH, determines by use of the equation (5) below whether or not a knock has been produced, and outputs a signal corresponding to the intensity of the knock. The comparison/calculation unit 20 concurrently performs the processing items of determining whether or not a knock has been produced, with regard to the plurality of frequencies.

$$VK(n)=\max[\{VMAV2(n)-VTH(n)\}/VTH(n),0] \quad (5)$$

where VK(n) is a knock intensity; when VK(n)>0, it is determined that a knock has been produced.

Based on the result of knock determination by the comparison/calculation unit 20, the each-ignition delayed angle calculation unit 21, which serves as a knock prevention unit, calculates, by use of the equation (6) below, the delayed angle corresponding to the knock intensity for each ignition.

$$\Delta\theta R(n)=\max\{-VK(n) \times Kg(n), \theta\min\} \quad (6)$$

where $\Delta\theta R(n)$ is an each-ignition delayed angle, Kg(n) is a delayed angle reflected coefficient, and $\theta\min$ is a maximum delayed angle.

In the case where $\Delta\theta R(n)>0$, the ignition timing is delayed in accordance with the each-ignition delayed angle $\Delta\theta R(n)$; in the case where $\Delta\theta R(n)=0$, the ignition timing is advanced by a predetermined angle. The determination on whether or not a knock has been produced and the control of the ignition timing may be implemented by use of other methods than the foregoing methods according to the equations (5) and (6), respectively.

Figure 5A:
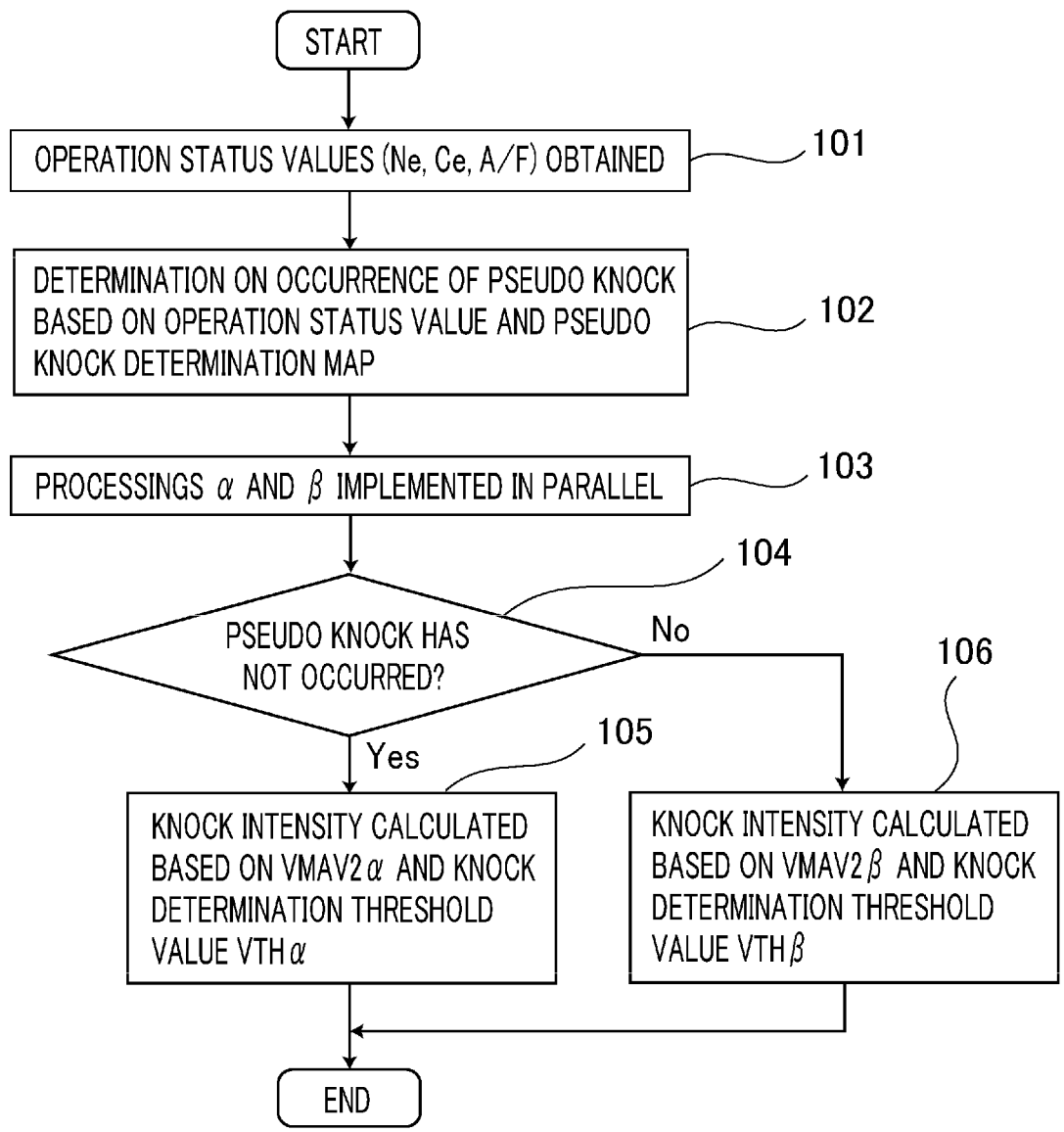
FIG. 5A is a flowchart for explaining the operation of an internal combustion engine control apparatus according to Embodiment 1 of the present invention.
Figure 5C:
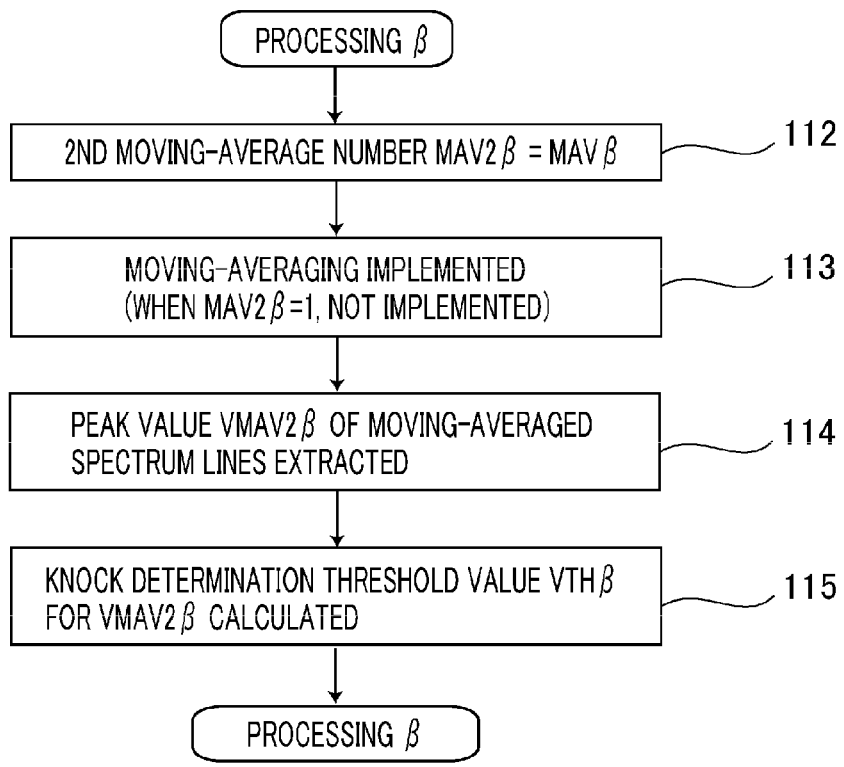
FIG. 5C is a flowchart for explaining the operation of an internal combustion engine control apparatus according to Embodiment 1 of the present invention.

FIGS. 5A through 5C are a set of flowcharts for explaining the operation of an internal combustion engine control apparatus according to Embodiment 1 of the present invention; the process from acquirement of the operation status value to calculation of the knock intensity is represented. The processing represented by the flowcharts in FIGS. 5A through 5C is implemented with regard to a plurality of frequencies utilized for detecting a knock, i.e., with regard to a low frequency F1 as the first frequency (referred to as a "frequency F1", hereinafter) and a high frequency F2 as the second frequency (referred to as a "frequency F2", hereinafter) in Embodiment 1.

The flowchart represented in FIG. 5A includes the processing of obtaining the operation status value (the step 101), the processing of determining whether or not a pseudo knock has been produced (the step 102), the processing of setting the second moving-average number and then calculating the knock determination threshold value (the step 103 and the steps 107 through 115), and the processing of calculating the knock intensity (the steps 104 through 106). Hereinafter, the steps will sequentially be explained, firstly from the step 101.

In FIG. 5(A), in the step 101, the rotation speed Ne of the internal combustion engine 1, the fuel filling rate Ce, which is a status amount indicating the condition of the load of the internal combustion engine 1, and the A/F are received from the operation status value detection unit 22; then, the step 101 is followed by the step 102.

In the step 102, it is determined whether or not a pseudo knock has been produced, based on the rotation speed Ne, the filling rate Ce, and the A/F which have been obtained in the step 101, the first frequency F1 and the second frequency F2 utilized for detecting a knock, and a pseudo knock determination map, described below.

Here, the pseudo knock determination map will be explained. FIG. 6 is a pseudo knock determination map in an internal combustion engine control apparatus according to Embodiment 1 of the present invention. With the parameters including the rotation speed Ne, the filling rate Ce, the A/F, and the first frequency F1 and the second frequency F2 which are utilized for detecting a knock, the pseudo knock determination map represented in FIG. 6 is divided by a threshold value Ne(1) and a threshold value Ne(2), which are a first threshold value and a second threshold value, respectively, related to the rotation speed Ne, a threshold value Ce(1) and a threshold value Ce(2), which are a first threshold value and a second threshold value, respectively, related to the filling rate Ce, and a threshold value A/F(1) and a threshold value A/F(2), which are a first threshold value and a second threshold value, respectively, related to the A/F.

Information on whether or not a pseudo knock has been produced is stored in each of the divisions; in the pseudo knock determination map in FIG. 6, the division in which "a pseudo knock has been produced" is described indicates an operation status in which a pseudo knock is produced, and the division in which "no pseudo knock has been produced" is described indicates an operation status in which no pseudo knock is produced.

The foregoing threshold values in the pseudo knock determination map are preliminarily written in the ROM region of the ECU 14; the threshold values are set, for example, by preliminarily testing the internal combustion engine and then specifying the operation status in which a pseudo knock is produced. For example, in the case where it is specified, through the test of the internal combustion engine, that at the frequency F1, when Ne<2500 [r/min], Ce≥0.7, and A/F≤13, a pseudo knock is produced, and at the frequency F2, when 2500≤Ne<3500 [r/min], Ce≥0.8, and A/F≤12.5, a pseudo knock is produced, the threshold values may be set in such a way that Ne(1)=2500 [r/min], Ne(2)=3500 [r/min], Ce(1)= 0.7, Ce(2)=0.8, A/F(1)=13, and A/F(2)=12.5.

In the case where it is assumed that the threshold values in the pseudo knock determination map in FIG. 6 are the foregoing values, and the rotation speed Ne, the filling rate Ce, and the A/F obtained in the step 101 of FIG. 5A are 2000 [r/min], 0.8, and 2.5, respectively, when in order to deal with the division indicated by the arrow X in the pseudo knock determination map in FIG. 6, processing for F1 has been implemented, it is determined that a pseudo knock has been produced; when processing for F2 has been implemented, it is determined that no pseudo knock has been produced. As described above, in the step 102, it is determined whether or not a pseudo knock has been produced, based on the rotation speed Ne, the filling rate Ce, and the A/F which have been obtained in the step 101, the first frequency F1 and the second frequency F2 utilized for detecting a knock, and the pseudo knock determination map in FIG. 6.

The pseudo knock determination map in FIG. 6 is just an example; if it is required that the operation status where a pseudo knock is produced is divided, the pseudo knock determination map may further be divided based on the result of specifying the operation status where a pseudo knock is produced, through the preliminary test of the internal combustion engine.

In FIG. 5A, after as described above, the determination on whether or not a pseudo knock has been produced is performed in the step 102, the step 102 is followed by the step 103. In the step 103, regardless of the result of the determination in the step 102, processing α, which is after-mentioned first processing represented in FIG. 5B, and processing 13, which is second processing represented in FIG. 5C, are implemented in a parallel manner.

The processing α represented in FIG. 5B is configured with the steps 107 through 111; the processing is implemented by use of the second moving-average number at a time when it is determined that no pseudo knock has been produced. The processing β represented in FIG. 5C is configured with the steps 112 through 115; the processing is implemented by use of the second moving-average number at a time when it is determined that a pseudo knock has been produced. The reason why the processing α and the processing β are implemented in a parallel manner will be explained later.

Here, the processing α represented in FIG. 5B will be explained. The processing α represented in FIG. 5B includes the step of setting of the first moving-average number MAV1 (the step 107), the step of setting of the second moving-average number MAV2α (the step 108), the step of moving-averaging (the step 109), the step of extracting the peak value VMAV2α of moving-averaged spectrum lines (the step 110), and the step of calculating the knock determination threshold value VTHα (the step 111).

In FIG. 5B, at first, in the step 107, the first moving-average number is set based on the rotation speed Ne and the filling rate Ce which have been obtained in the step 101, the first frequency F1 and the second frequency F2 utilized for detecting a knock, and a first moving-average number map represented in FIG. 7.

Here, the first moving-average number map represented in FIG. 7 will be explained. With the parameters including the rotation speed Ne, the filling rate Ce, and the first frequency F1 and the second frequency F2 which are utilized for detecting a knock, the first moving-average number map represented in FIG. is divided by threshold values Ne1(1) and Ne1(2) related to the rotation speed Ne, threshold values Ce1(1) through Ce1(6) related to the filling rate Ce, the frequency F1, and the frequency F2.

For the convenience of explanation, the map represented in FIG. 7 is divided by a low rotation speed region (A1) as Ne<Ne1(1), a middle rotation speed region (A2) as Ne1(1) ≤Ne<Ne1(2), and a high rotation speed region (A3) as Ne≥Ne1(2).

The low rotation speed region (A1) is divided by a low load region (B1) as Ce<Ce1(1), a middle load region (B2) as Ce1(1)≤Ce<Ce1(2), and a high load region (B3) as Ce≥Ce1 (2).

Similarly, the middle rotation speed region (A2) is divided by a low load region (B4) as Ce<Ce1(3), a middle load region (B5) as Ce1(3)≤Ce<Ce1(4), and a high load region (B6) as Ce≥Ce1(4).

Furthermore, the high rotation speed region (A3) is divided by a low load region (B7) as Ce<Ce1(5), a middle load region (B8) as Ce1(5)≤Ce<Ce1(6), and a high load region (B9) as Ce≥Ce1(46).

The first moving-average numbers MAV1(A1, B1, F1) through MAV1(A3, B9, F2) are stored in the respective divisions of the map in FIG. 7; for example, MAV1(A1, B1, F1) denotes the first moving-average number at an operation status of the low rotation speed region (A1), the low load region (B1), and the frequency F1.

The respective threshold values of the first moving-average number map and the first moving-average numbers MAV1 (A1, B1, F1) through MAV1(A3, B9, F2) are preliminarily stored in the ROM region of the ECU 14.

The first moving-average numbers MAV1(A1, B1, F1) through MAV1(A3, B9, F2) represented in FIG. 7 are set in such a way that mechanical noise and electric noise are reduced and hence the S/N ratio is raised. Next, with reference to FIG. 8, setting of the first moving-average numbers MAV1(A1, B1, F1) through MAV1(A3, B9, F2) and the respective threshold values of the first moving-average number map will be explained.

FIG. 8 is a set of charts for comparing the characteristics of the relationship between the crank angle and the spectrum at a time when a knock occurs with the characteristics of the relationship between the crank angle and the spectrum at a time when mechanical noise occurs (but no knock occurs); the abscissa denotes the crank angle, and the ordinate denotes the spectrum. FIG. 8(1) represents the characteristics of the relationship between the crank angle and the spectrum at a time when a DFT is implemented by utilizing vibration data in the crank-angle range from ATDC[−10°] CA to ATDC [80°] CA. FIG. 8(2) represents the characteristics of the relationship between the crank angle and the spectrum at a time when the characteristics of the relationship between the crank angle and the spectrum represented in FIG. 8(1) are moving-averaged by utilizing spectra, the number of which corresponds to a period the same as the width (refer to FIG. 8(1)) of the knock waveform. FIG. 8(3) represents the characteristics of the relationship between the crank angle and the spectrum at a time when the characteristics of the relationship between the crank angle and the spectrum represented in FIG. 8(1) are moving-averaged by utilizing a moving-average number, which is larger than the moving-average number in FIG. 8(2).

In FIGS. 8(1), 8(2), and 8(3), "S" is the peak value of the characteristics of the relationship between the crank angle and the spectrum at a time when a knock occurs, and "N" is the peak value of the characteristics of the relationship between the crank angle and the spectrum at a time when mechanical noise occurs; the S/N, which is the ratio of the peak value S to the peak value N, is described in each of the bottom columns of FIGS. 8(1), 8 (2), and 8(3).

In FIG. 8(1), FIG. 8(2), and FIG. 8(3), the S/Ns are 0.875, 3.195, and 2.762, respectively; thus, it is desirable that the first moving-average number is set to a moving-average number corresponding to a period that is the same as the width of the knock waveform. Accordingly, for example, a test of the internal combustion engine is preliminarily performed, and based on the characteristics of the relationship between the crank angle and the spectrum in each operation status, the width of a knock waveform is specified, so that the first moving-average numbers MAV1(A1, B1, F1) through MAV1 (A3, B9, F2) represented in FIG. 7 and the respective threshold values of the first moving-average number map are set.

Here, as an example, there will be explained a case where the width of a knock waveform in each operation status is specified by preliminarily implementing tests of the internal combustion engine, with three patterns of the rotation speed Ne, i.e., 1000 [r/min], 3000 [r/min], and 5000 [r/min], and with three patterns of the filling rate Ce for each of the foregoing patterns of the rotation speed Ne, i.e., a filling rate Ce_HI at a time when the throttle is fully opened, a filling rate Ce_LO at a time when the ignition timing of the knock limit and the ignition timing of the maximum torque approximately coincide with each other, and a filling rate Ce_MID that is an intermediate rate between the filling rate Ce_LO at a time when the ignition timing of the knock limit and the ignition timing of the maximum torque approximately coincide with each other and the filling rate Ce_HI at a time when the throttle is fully opened.

The threshold values with regard to the rotation speed Ne in the first moving-average number map are set to Ne1(1)=2000 [r/min] (an intermediate rotation speed between the rotation speeds 1000 [r/min] and 3000 [r/min]) and Ne1(2)=4000 [r/min] (an intermediate rotation speed between the rotation speeds 3000 [r/min] and 5000 [r/min]). As far as the threshold values with regard to the filling rate Ce in the first moving-average number map are concerned, it may be allowed that, for example, Ce1(3) is set to an intermediate filling rate (e.g., C1(3)=0.5) between the foregoing Ce_LO and Ce_MID at the rotation speed of 3000 [r/min] and Ce1(4) is set to an intermediate filling rate (e.g., C1(4)=0.7) between Ce MID and Ce HI at the rotation speed of 3000 [r/min].

As far as the first moving-average numbers MAV1(A1, B1, F1) through MAV1(A3, B9, F2) are concerned, it may be allowed that, for example, MAV1(A1, B1, F1) is set to a moving-average number corresponding to a period that is the same as the width of a knock waveform at a time when Ne is 1000 [r/min], Ce is Ce LO at the rotation speed 1000 [r/min], and the frequency is F1, MAV1(A2, B5, F2) is set to a moving-average number corresponding to a period that is the same as the width of a knock waveform at a time when Ne is 3000 [r/min], Ce is Ce_MID at the rotation speed 3000 [r/min], and the frequency is F2, and MAV1(A3, B9, F1) is set to a moving-average number corresponding to a period that is the same as the width of a knock waveform at a time when Ne is 5000 [r/min], Ce is Ce_HI at the rotation speed 5000 [r/min], and the frequency is F1. In such a manner as described above, the first moving-average numbers MAV1 (A1, B1, F1) through MAV1(A3, B9, F2) and the respective threshold values of the first moving-average number map are set.

The first moving-average number map in FIG. 7 is just an example; in the case where the number of operation status patterns that are implemented in the preliminary test of the internal combustion engine is larger than the number described above, the first moving-average number map may further be divided, as may be necessary.

In the case where it is assumed that the threshold values in the first moving-average number map in FIG. 7 are the foregoing values, and the rotation speed Ne and the filling rate Ce obtained in the step 101 of FIG. 5A are 2000 [r/min] and 0.8, respectively, the present column corresponds to the division indicated by the arrow Y in the first moving-average number map in FIG. 7; thus, when processing for the frequency F1 is implemented, the first moving-average number MAV1 is set to the value of MAV1(A2, B6, F1); when processing for the frequency F2 is implemented, the first moving-average number MAV1 is set to the value of MAV1 (A2, B6, F2).

In FIG. 5B, after in the step 107, the first moving-average number MAV1 is set in such a manner as described above, the step 107 is followed by the step 108. In the step 108, the second moving-average number MAV2α is set to the value of the first moving-average number MAV1 set in the step 107; then, the step 108 is followed by the step 109.

In the step 109, moving-average is performed by use of the second moving-average number MAV2α set in the step 108; then, the step 109 is followed by the step 110.

In the step 110, the peak value VMAV2α is extracted from the moving-averaged spectrum lines calculated in the step 109; then, the step 110 is followed by the step 111.

In the step 111, by use of the foregoing equations (1) through (4), the knock determination threshold value VTHα for the second moving-average number VMAV2α calculated in the step 110 is calculated; then, the processing α is ended.

Next, the processing β represented in FIG. 5C will be explained. The processing β represented in FIG. 5C includes the step of setting of a second moving-average number MAV2β (the step 112), the step of moving-averaging (the step 113), the step of extracting the peak value VMAV2β of moving-averaged spectrum lines (the step 114), and the step of calculating a knock determination threshold value VTHβ (the step 115).

In FIG. 5C, at first, in the step 112, the second moving-average number MAV2β is set to MAVβ. MAVβ is preliminarily written in the ROM region of the ECU 14; MAVβ is set to "1" (no moving-average is performed) or, for example, "3" (setting for reducing steep electric noise and mechanical noise), i.e., no moving-average is performed or the second moving-average number is set to a number that is smaller than the first moving-average number, so that the S/N is suppressed from being deteriorated when a pseudo knock is produced. In the step 112, the second moving-average number MAV2β is set; then, the step 112 is followed by the step 113.

In the step 113, moving-average is performed by use of the second moving-average number MAV2β set in the step 112; then, the step 113 is followed by the step 114. In this regard, however, when MAV2β is "1", no moving-average is performed, and the step 112 is followed by the step 114.

In the step 114, the peak value VMAV2β is extracted from the moving-averaged spectrum lines (from non-moving-averaged spectrum lines when MAV2β is "1") calculated in the step 113; then, the step 114 is followed by the step 115.

In the step 115, by use of the foregoing equations (1) through (4), the knock determination threshold value VTHβ for the second moving-average number VMAV2β calculated in the step 114 is calculated; then, the processing β is ended.

Next, in FIG. 5A, after in the step 103, the processing α (in FIG. 5B) and the processing β (in FIG. 5C) are completed in a parallel manner, the step 103 is followed by the step 104. In the case where it has been determined in the step 102 that no pseudo knock was produced, the step 104 is followed by the step 105; in the case where it has been determined in the step 102 that a pseudo knock was produced, the step 104 is followed by the step 106.

In the case where the step 104 is followed by the step 105, it has been determined that no pseudo knock was produced; therefore, the knock intensity is calculated by use of the result at a time when the second moving-average number is set to a number that is the same as the first moving-average number. In other words, by use of the equation (5), the knock intensity is calculated based on the peak value VMAV2α of the moving-averaged spectrum lines calculated in the step 110 for the processing α and the knock determination threshold value VTHα calculated in the step 111; then, the calculated knock intensity is transmitted to the each-ignition delayed angle calculation unit 21 in FIG. 3.

In the case where the step 104 is followed by the step 106, it has been determined that a pseudo knock was produced; therefore, the knock intensity is calculated by use of the result at a time when the second moving-average number MAV2β is set to "1" or a number that is smaller than the first moving-average number. In other words, by use of the equation (5), the knock intensity is calculated based on the second moving-average number MAV2β calculated in the step 114 for the processing β and the knock determination threshold value VTHβ calculated in the step 115; then, the calculated knock intensity is transmitted to the each-ignition delayed angle calculation unit 21 in FIG. 3.

Next, with reference to FIG. 10, there will be explained the reason why the processing α and the processing β are implemented in a parallel manner in the step 103 of FIG. 5A, regardless of the result of determination on whether or not a pseudo knock has been produced. FIG. 10 is a set of charts representing the behaviors of the peak value and the knock determination threshold value at a time when no knock occurs, in an internal combustion engine control apparatus according to Embodiment 1 of the present invention; the behaviors of the peak value VMAV2 (VMAV2α and VMAV2β) and the knock determination threshold value VTH (VTHα and VTHβ) at a time when no knock has been produced (determined that a pseudo knock is produced in 40 sec).

FIG. 10(1) represents the behaviors of the peak value VMAV2 and the knock determination threshold value VTH at a time when the processing α and the processing β are not implemented in a parallel manner in the step 103 of FIG. 5A, but, instead of that, only the processing α is implemented in the case where it has been determined in the step 102 of FIG. 5A that no pseudo knock was produced, and only the processing β is implemented in the case where it has been determined that a pseudo knock was produced.

FIG. 10(2) represents the behaviors of the peak value VMAV2 and the knock determination threshold value VTH at a time when the processing α and the processing β are implemented in a parallel manner in the step 103 of FIG. 5A; the upper chart in FIG. 10(2) represents the behavior of the peak value VMAV2 (=VMAV2α) and the knock determination threshold value VTH (=VTHα) at a time when the processing α is implemented; the lower chart in FIG. 10(2) represents the behavior of the peak value VMAV2 (=VMAV2β) and the knock determination threshold value VTH (=VTHβ) at a time when the processing β is implemented.

In each of the charts in FIG. 10, VMAV2β=1. In each of the charts, the abscissa denotes the time [sec], and the ordinate denotes the peak value VMAV2 and the knock determination threshold value VTH. The hatched region (the region after 40 [sec]) in the upper chart of FIG. 10(2) and the hatched region (the region before 40 [sec]) in the lower chart are the periods for which it is determined in the step 104 of FIG. 5A that the knock intensity is not calculated.

As represented in FIG. 10(1), in the case where the processing α and the processing β are not implemented in a parallel manner, due to the difference between the second moving-average number at a time when it has been determined that no pseudo knock was produced and the second moving-average number at a time when it has been determined that a pseudo knock was produced, a rapid and abrupt change occurs in the peak value VMAV2 when transition is made from an operation status where no pseudo knock is produced to an operation status where a pseudo knock is produced, whereby a mal-detection occurs before the knock determination threshold value VTH stabilizes. In contrast, in the case where as represented in FIG. 10(2), the processing α and the processing β are implemented in a parallel manner, no rapid and abrupt change occurs in the peak value VMAV2 even when transition is made from an operation status where no pseudo knock is produced to an operation status where a pseudo knock is produced; thus, no mal-detection occurs.

As described above, in an internal combustion engine control apparatus according to Embodiment 1 of the present invention, it is determined whether or not a pseudo knock has been produced, based on at least one of the frequency utilized for detecting a knock, the rotation speed of the internal combustion engine, the load, and the A/F. In the case where it has been determined that no pseudo knock was produced, the second moving-average number is set to a number that is the same as the first moving-average number, and then moving-averaging is implemented. In contrast, in the case where it has been determined that a pseudo knock was produced, the second moving-average number is set to "1" or a number that is smaller than the first moving-average number, and then moving-averaging is implemented. In such a way as described above, there can be obtained an effect that even in the case where a pseudo knock is produced, the knock detectability and the mal-detection tolerance are suppressed from being deteriorated.

Moreover, in an internal combustion engine control apparatus according to Embodiment 1 of the present invention, regardless of the result of determination on whether or not a pseudo knock has been produced, the process from moving-averaging to calculation of a knock determination threshold value is implemented in a parallel manner by use of two second moving-average numbers, i.e., the second moving-average number at a time when it has been determined that no pseudo knock was produced and the second moving-average number at a time when it has been determined that a pseudo knock was produced. In such a way as described above, a knock can rapidly be determined immediately after transition is made between an operation status where no pseudo knock is produced and an operation status where a pseudo knock is produced; therefore, there can be obtained an effect that a mal-detection is suppressed from occurring in a period from a time point immediately after transition is made between an operation status where no pseudo knock is produced and an operation status where a pseudo knock is produced to a time point when the knock determination threshold value stabilizes.

Various modifications and alterations of this invention will be apparent to those skilled in the art without departing from the scope and spirit of this invention, and it should be understood that this is not limited to the illustrative embodiments set forth herein.

What is claimed is:

1. An internal combustion engine control apparatus comprising:
   a vibration sensor that detects, as vibration data, a vibration or a pressure wave produced inside a cylinder of an internal combustion engine; and
   an electronic control unit (ECU) comprising:
   a knock detection window setting unit that preliminarily sets a knock detection window, in accordance with an operation status of the internal combustion engine, in such a way that the knock detection window includes a first period in which a level of the vibration produced by a knock of the internal combustion engine conspicuously appears;
   a digital-signal processing unit that concurrently calculates, with regard to a plurality of frequencies, vibration levels, in steps of a predetermined time, that are obtained by applying a time-frequency analysis to the vibration data detected in the knock detection window;
   a moving-average processing unit that implements, with regard to the plurality of frequencies, processing for a first condition and a second condition, in which the vibration levels in steps of the predetermined time are sequentially moving-averaged by a use of a second period, which is set to be substantially the same as the first period for the first condition in which the pseudo knock is not produced, and is set to be narrower than the first period for the second condition in which the pseudo knock is produced, and a peak value of the moving-averaged vibration levels is extracted;
   a knock determination unit that implements, with regard to the plurality of frequencies, processing in which a first threshold value is calculated based on an extracted peak value for the first condition and a second threshold value is calculated based on the extracted peak value for the second condition, determines whether the knock has been produced, and outputs a signal corresponding to a knock intensity if it is determined that the knock has been produced;
   a knock prevention unit that takes action for preventing the knock in response to determining that the knock has been produced, with regard to at least one of the plurality of frequencies, by calculating an angle of an ignition timing in correspondence with the knock intensity of the signal output by the knock determination unit and controlling the ignition timing in correspondence to the calculated angle; and
   a pseudo knock determination unit that determines whether or not the pseudo knock has been produced in the knock detection window, based on at least one of the plurality of frequencies, a status amount indicating a rotation speed of the internal combustion engine, a status amount indicating a load of the internal combustion engine, and a status amount indicating an air-fuel ratio of the internal combustion engine,
   wherein the moving-average processing unit concurrently implements the processing for the first condition and the processing for the second condition, regardless of a result of a determination by the pseudo knock determination unit on whether or not the pseudo knock has been produced, and
   the knock determination unit concurrently implements the processing in which the first threshold value is calculated for the first condition and the processing in which the second threshold value is calculated for the second condition, and determines whether the knock has been produced by comparing the extracted peak value and the first threshold in response to determining that the pseudo knock has not been produced, and by comparing the extracted peak value and the second threshold in response to determining that the pseudo knock has been produced, by the pseudo knock determination unit.

2. The internal combustion engine control apparatus according to claim 1, wherein the pseudo knock determination unit determines whether the pseudo knock has been produced based on a pseudo knock determination map that is preliminarily set.

3. The internal combustion engine control apparatus according to claim 1, wherein each of the first period and the second period corresponds to a moving-average number with which the vibration levels in steps of the predetermined time are sequentially moving-averaged.

4. The internal combustion engine control apparatus according to claim 3, wherein the moving-average number is determined based on a moving-average number map that is preliminarily set in accordance with the rotation speed of the internal combustion engine.

5. An internal combustion engine control apparatus comprising:
   a vibration sensor that detects, as vibration data, a vibration or a pressure wave produced inside a cylinder of an internal combustion engine; and
   an electronic control unit (ECU) comprising:
     a knock detection window setting unit that preliminarily sets a knock detection window, in accordance with an operation status of the internal combustion engine, in such a way that the knock detection window includes a first period in which a level of the vibration produced by a knock of the internal combustion engine conspicuously appears;
     a digital-signal processing unit that concurrently calculates, with regard to a plurality of frequencies, vibration levels, in steps of a predetermined time, that are obtained by applying a time-frequency analysis to the vibration data detected in the knock detection window;
     a moving-average processing unit that implements, with regard to the plurality of frequencies, processing in which the vibration levels in steps of the predetermined time are sequentially moving-averaged by a use of a second period, which is set based on the first period for a first condition in which a pseudo knock is not produced, and by a use of a third period, which is set to be different in length from the second period, for a second condition in which the pseudo knock is produced, and a peak value of the moving-averaged vibration levels is extracted;
     a knock determination unit that implements, with regard to the plurality of frequencies, processing in which a threshold value is calculated based on an extracted peak value, for the first condition and the second condition, and the extracted peak value and the threshold value are compared with each other to determine whether the knock has been produced, and that outputs a signal corresponding to a knock intensity if it is determined that the knock has been produced;
     a knock prevention unit that takes action for preventing the knock in response to determining that the knock has been produced, with regard to at least one of the plurality of frequencies, by calculating an angle of an ignition timing in correspondence with the knock intensity of the signal output by the knock determination unit and controlling the ignition timing in correspondence to the calculated angle; and
     a pseudo knock determination unit that determines whether or not the pseudo knock has been produced in the knock detection window, based on at least one of the plurality of frequencies, a status amount indicating a rotation speed of the internal combustion engine, a status amount indicating a load of the internal combustion engine, and a status amount indicating an air-fuel ratio of the internal combustion engine,
   wherein the moving-average processing unit implements, in parallel, the processing for the first condition and the processing for the second condition, regardless of a result of a determination by the pseudo knock determination unit on whether or not the pseudo knock has been produced, and
   the knock determination unit performs, in parallel, the processing in which the threshold value is calculated for the first condition and the processing in which the threshold value is calculated for the second condition.

6. The internal combustion engine control apparatus according to claim 5, wherein the pseudo knock determination unit determines whether the pseudo knock has been produced based on a pseudo knock determination map that is preliminarily set based on all information on the rotation speed of the internal combustion engine, the load of the internal combustion engine, and the air-fuel ratio of the internal combustion engine.

7. The internal combustion engine control apparatus according to claim 5, wherein each of the first period and the second period corresponds to a moving-average number with which the vibration levels in steps of the predetermined time are sequentially moving-averaged.

8. The internal combustion engine control apparatus according to claim 7, wherein the moving-average number is determined based on a moving-average number map that is preliminarily set in accordance with the rotation speed of the internal combustion engine.

* * * * *